US 11,254,424 B2

(12) United States Patent
Baldwin et al.

(10) Patent No.: US 11,254,424 B2
(45) Date of Patent: Feb. 22, 2022

(54) BALANCE WEIGHT ASSEMBLIES FOR ROTOR BLADES

(71) Applicant: Textron Innovations Inc., Providence, RI (US)

(72) Inventors: Tyler Wayne Baldwin, Keller, TX (US); Jared Mark Paulson, Fort Worth, TX (US); Colin John Thomas, Carrollton, TX (US); Paul Branson Sherrill, Grapevine, TX (US); Bryan Huber, Keller, TX (US)

(73) Assignee: Textron Innovations Inc., Providence, RI (US)

( * ) Notice: Subject to any disclaimer, the term of this patent is extended or adjusted under 35 U.S.C. 154(b) by 216 days.

(21) Appl. No.: 16/587,967

(22) Filed: Sep. 30, 2019

(65) Prior Publication Data

US 2021/0094677 A1    Apr. 1, 2021

(51) Int. Cl.
*B64C 27/00* (2006.01)
*B64C 27/473* (2006.01)
*F01D 5/02* (2006.01)

(52) U.S. Cl.
CPC .......... *B64C 27/008* (2013.01); *B64C 27/473* (2013.01); *F01D 5/027* (2013.01)

(58) Field of Classification Search
CPC ... B64C 27/008; B64C 27/028; B64C 27/473; B64C 11/008
See application file for complete search history.

(56) References Cited

U.S. PATENT DOCUMENTS

| | | | | |
|---|---|---|---|---|
| 3,999,888 A | * | 12/1976 | Zincone | B64C 27/008 416/145 |
| 5,273,398 A | * | 12/1993 | Reinfelder | B64C 27/008 416/144 |
| 5,346,367 A | * | 9/1994 | Doolin | B29D 99/0025 156/213 |
| 7,097,427 B2 | | 8/2006 | Kuhns et al. | |
| 7,118,343 B2 | * | 10/2006 | Loftus | B64C 27/008 416/145 |
| 9,249,851 B2 | | 2/2016 | Gill et al. | |
| 9,403,594 B2 | * | 8/2016 | Gill, III | B64C 27/473 |

(Continued)

OTHER PUBLICATIONS

SmartBolts, 5 Causes of Loose Bolts—and 5 Ways to Prevent Them (Year: 2017).*

Primary Examiner — David E Sosnowski
Assistant Examiner — Hakeem M Abdellaoui
(74) Attorney, Agent, or Firm — Lawrence Youst PLLC

(57) ABSTRACT

A balance weight assembly for a rotor blade of a rotorcraft. The balance weight assembly includes a balance weight pocket formed by a balance weight tray and a cover. The balance weight tray has an upper surface including a lip region extending outwardly from a projected region with an outboard boss. A balance weight receiving cavity is recessed from the upper surface and contains a plurality of balance weights. The projected region is disposed within an opening in a hollow blade spar such that the outboard boss of the balance weight tray has a contact relationship with an outboard surface of the opening. The cover is coupled to the balance weight tray such that the lip region of the balance weight tray and at least a portion of the cover have a clamping relationship with the blade spar, thereby coupling the balance weight pocket to the blade spar.

20 Claims, 7 Drawing Sheets

(56) References Cited

U.S. PATENT DOCUMENTS

| | | |
|---|---|---|
| 10,227,132 B2 | 3/2019 | Sutton et al. |
| 10,723,448 B2 * | 7/2020 | Paulson ................ B64C 27/008 |
| 10,981,647 B2 * | 4/2021 | Self ....................... B64C 27/473 |
| 2018/0135728 A1 * | 5/2018 | Paulson ................ B64C 27/473 |
| 2019/0031327 A1 * | 1/2019 | Sherrill ................ B64C 27/473 |
| 2019/0039726 A1 | 2/2019 | Self et al. |

* cited by examiner

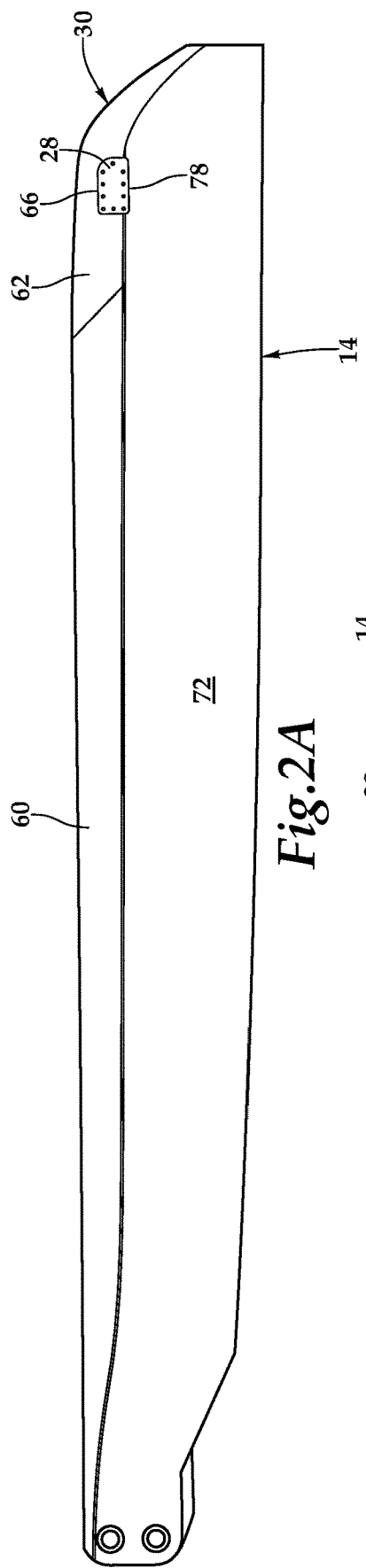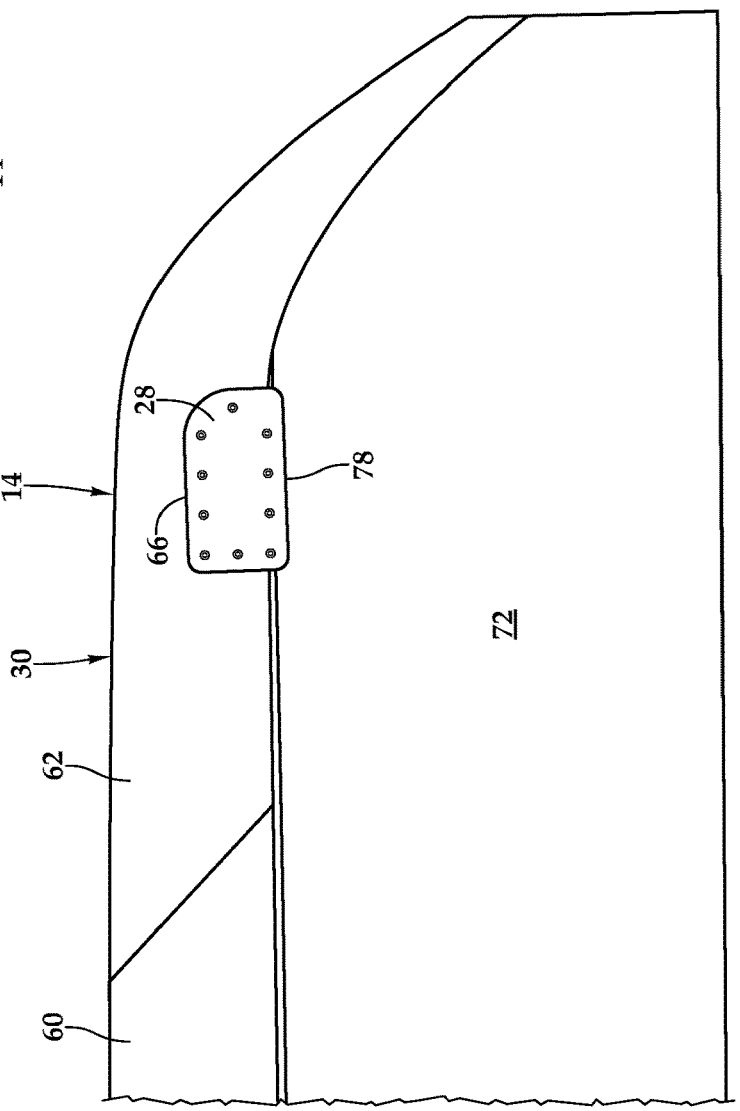
Fig.2A
Fig.2B

BALANCE WEIGHT ASSEMBLIES FOR ROTOR BLADES

TECHNICAL FIELD OF THE DISCLOSURE

The present disclosure relates, in general, to balance weights for adjusting the spanwise and chordwise balance of rotor blades and, in particular, to balance weight assemblies having a balance weight pocket with balance weights disposed therein that is received within an opening of a blade spar and is coupled thereto without fastening bolts extending through the blade spar structure.

BACKGROUND

The rotor system of a rotorcraft, such as a helicopter, typically includes a plurality of rotor blades that are coupled to a rotor hub. In certain implementations, this rotor system is mounted on a vertical mast atop the rotorcraft such that rotation of the rotor system generates vertical lift, which supports the weight of the rotorcraft, and lateral thrust, which allows the rotorcraft to engage in forward, backward and sideward flight. It is important that the rotor blades of a rotor system are properly balanced in both the spanwise and chordwise directions. Improperly balanced rotor blades not only cause excessive vibrations, but also cause increased loads in critical dynamic components. The end result of improperly balanced rotor blades can be degraded flying qualities and reduced component lives due to premature fatigue failure.

To achieve static balance, a rotor blade is balanced relative to a master blade prior to installation of the rotor blade onto the rotorcraft. For dynamic balance, a rotor blade may be balanced either on a whirl stand or on the rotorcraft against a master blade or the other rotor blades of the rotorcraft. Adjustments in the balance of a rotor blade are made using balance weights that are installed inside the blade structure near the tip. For example, some rotor blades have both leading edge and trailing edge pockets near the tip for housing spanwise and chordwise balance weights. Typically, the balance weights are retained in these pockets using fastening bolts. It has been found, however, that centrifugal force generated by the rotation of the rotor system can subject the fastening bolts to shear loads creating high stress concentrations that can lead to failure of the fastening bolts. A need has therefore arisen for a balance weight assembly that does not subject fastening bolts to high stress concentrations responsive to the centrifugal force generated by the rotor system.

SUMMARY

In a first aspect, the present disclosure is directed to a balance weight assembly for a rotor blade of a rotorcraft. The rotor blade includes a hollow blade spar having an opening with an outboard surface. The balance weight assembly includes a balance weight pocket formed with a balance weight tray and a cover. The balance weight tray has an upper surface including a lip region extending outwardly from a projected region with an outboard boss. The balance weight tray defines a balance weight receiving cavity recessed from the upper surface. A plurality of balance weights is disposed within the balance weight receiving cavity. The projected region of the balance weight tray is disposed within the opening of the blade spar such that the outboard boss of the balance weight tray has a contact relationship with the outboard surface of the opening of the blade spar. The cover is coupled to the balance weight tray such that the lip region of the balance weight tray and at least a portion of the cover have a clamping relationship with the blade spar, thereby coupling the balance weight pocket to the blade spar.

In certain embodiments, the outboard surface of the opening in the blade spar and the outboard boss of the balance weight tray may have complementary surfaces such as complementary arcuate surfaces or complementary semicircular surfaces. In some embodiments, the outboard surface of the opening in the blade spar may be a centrifugal force reaction surface for the outboard boss. In certain embodiments, an adhesive layer may be disposed between the lip region of the balance weight tray and an interior surface of the blade spar forming a bonded relationship therebetween. In some embodiments, a plurality of fasteners may couple the cover to the balance weight tray through fastener openings in the projected region of the balance tray, thereby not requiring fastener openings in the blade spar. In such embodiments, the fasteners may include bolts and/or self-locking threaded inserts positioned within the fastener openings in the projected region of the balance tray.

In certain embodiments, the balance weights may include constant weight elements and/or variable weight elements configured for fine tuning weight adjustments. In some embodiments, the balance weights may include weight elements and spacer elements. In certain embodiments, the balance weights may include leading weight elements and trailing weight elements. In some embodiments, the balance weights may include outboard weight elements and inboard weight elements. In certain embodiments, the balance weights may be configured for variable weight distributions enabling spanwise and chordwise balancing of the rotor blade. In some embodiments, at least one gasket may be positioned between the cover and the projected region of the balance weight tray. In certain embodiments, at least one compressible member may be disposed between the cover and the balance weights to prevent movement of the balance weights during flight.

In a second aspect, the present disclosure is directed to a rotor system for a rotorcraft. The rotor system includes a first rotor blade having an outer airfoil surface with a hollow blade spar disposed therein. The blade spar has an opening with an outboard surface. A balance weight pocket is formed with a balance weight tray and a cover. The balance weight tray has an upper surface including a lip region extending outwardly from a projected region with an outboard boss. The balance weight tray defines a balance weight receiving cavity recessed from the upper surface. A plurality of balance weights is disposed within the balance weight receiving cavity. The projected region of the balance weight tray is disposed within the opening of the blade spar such that the outboard boss of the balance weight tray has a contact relationship with the outboard surface of the opening of the blade spar. The cover is coupled to the balance weight tray such that the lip region of the balance weight tray and at least a portion of the cover have a clamping relationship with the blade spar, thereby coupling the balance weight pocket to the blade spar.

In certain embodiments, the first rotor blade may have a tip region and a pitch change axis. In such embodiments, the balance weight pocket may be disposed within the tip region of the first rotor blade and/or the balance weight pocket may be aligned with the pitch change axis.

In a third aspect, the present disclosure is directed to a rotorcraft, such as a helicopter, that includes a fuselage and a rotor system that is rotatable relative to the fuselage. The rotor system includes a rotor hub and a plurality of rotor blades including a first rotor blade. The first rotor blade has an outer airfoil surface with a hollow blade spar disposed therein. The blade spar has an opening with an outboard surface. A balance weight pocket is formed with a balance weight tray and a cover. The balance weight tray has an upper surface including a lip region extending outwardly from a projected region with an outboard boss. The balance weight tray defines a balance weight receiving cavity recessed from the upper surface. A plurality of balance weights is disposed within the balance weight receiving cavity. The projected region of the balance weight tray is disposed within the opening of the blade spar such that the outboard boss of the balance weight tray has a contact relationship with the outboard surface of the opening of the blade spar. The cover is coupled to the balance weight tray such that the lip region of the balance weight tray and at least a portion of the cover have a clamping relationship with the blade spar, thereby coupling the balance weight pocket to the blade spar.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 2A-2C are various views of a rotor blade including a balance weight assembly coupled to a hollow blade spare in accordance with embodiments of the present disclosure;

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1A:
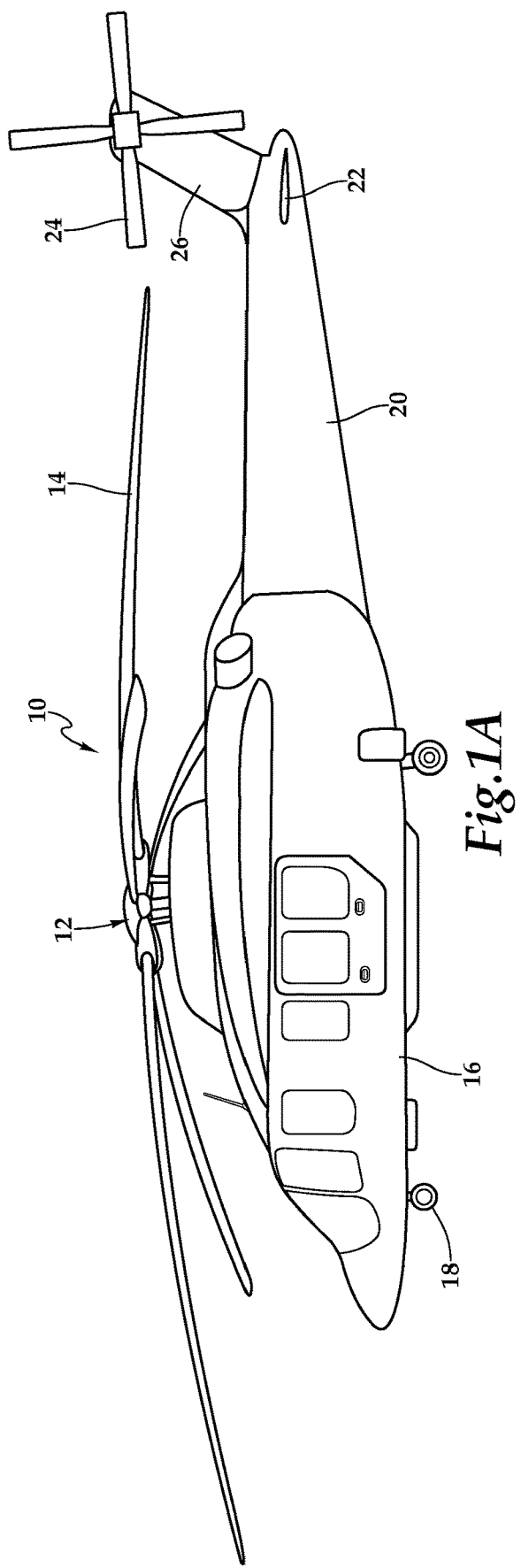
FIGS. 1A-1C are schematic illustrations of a rotorcraft having balance weight assemblies disposed in the rotor blades of a rotor system in accordance with embodiments of the present disclosure.
Figure 1B:
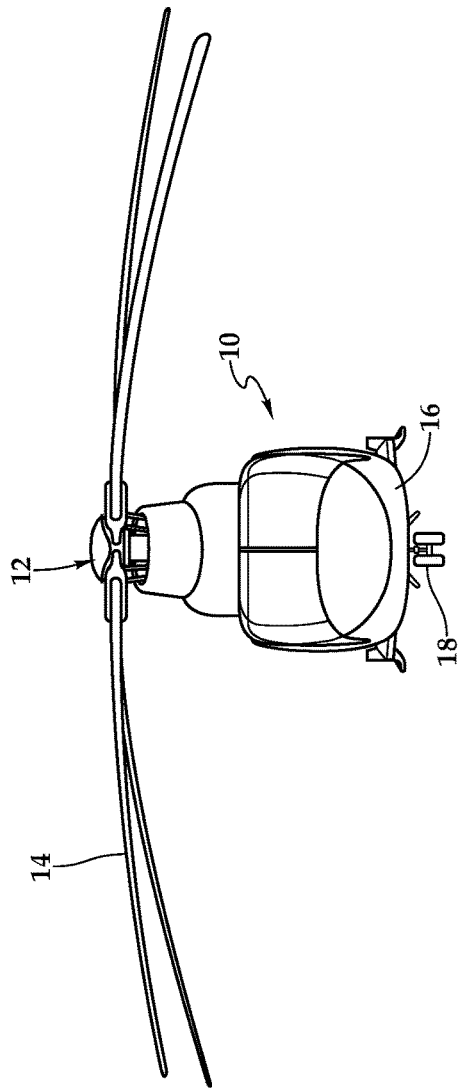
Figure 1C:
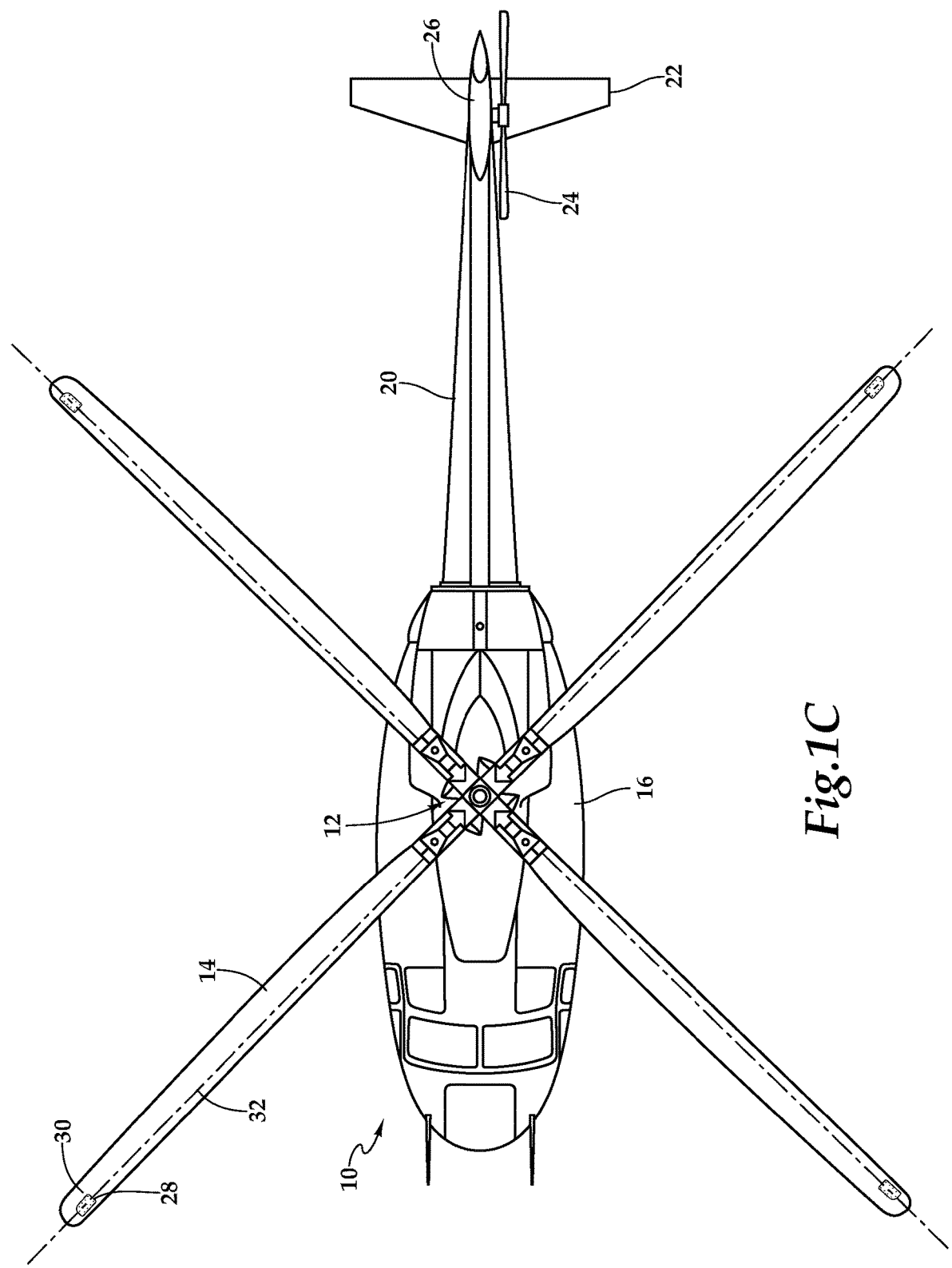

Referring to FIGS. 1A-1C in the drawings, a rotorcraft depicted as a helicopter is schematically illustrated and generally designated 10. Rotorcraft 10 has a main rotor system 12 including a rotor hub with a plurality of rotor blades 14 extending therefrom. Rotor system 12 is rotatable relative to a fuselage 16 of rotorcraft 10. The pitch of rotor blades 14 can be collectively and/or cyclically manipulated to selectively control direction, thrust and lift of rotorcraft 10. A landing gear system 18 provides ground support for rotorcraft 10. A tailboom 20 extends in the aft direction from fuselage 16. Horizontal stabilizers 22 extend laterally from an aft portion of tailboom 20. A tail rotor 24 is rotatable relative to a vertical fin 26 that extends vertically and aftwardly from tailboom 20. Tail rotor 24 controls the yaw of rotorcraft 10.

Rotor blades 14 each include a balance weight assembly 28 located in a tip region 30 of the rotor blade that is aligned with a pitch change axis 32 of the rotor blade. Balance weight assemblies 28 include a plurality of balance weights that are configurable for variable weight distributions enabling spanwise and chordwise balancing of each rotor blade 14. In addition, each balance weight assembly 28 is coupled to a blade spar of each rotor blade 14 such that during rotary operations, the centrifugal force of the balance weights is reacted to the blade spar without subjecting fastening bolts to shear forces or high stress concentrations. Even though a single balance weight assembly 28 is depicted in the tip region and aligned with the pitch change axis of each rotor blade 14, it should be understood by those having ordinary skill in the art that other numbers of balance weight assemblies could be located in alternate positions in a rotor blade to match specific requirements and constraints in other embodiments.

It should be appreciated that rotorcraft 10 is merely illustrative of a variety of aircraft that can implement the embodiments disclosed herein. Indeed, balance weight assemblies 28 may be utilized on any aircraft having a rotor system or rotor blades. Other aircraft implementations can include hybrid aircraft, tiltrotor aircraft, tiltwing aircraft, quad tiltrotor aircraft, unmanned aircraft, gyrocopters, propeller-driven airplanes and the like. As such, those skilled in the art will recognize that balance weight assemblies 28 can be integrated into a variety of aircraft configurations. It should also be appreciated that even though aircraft are particularly well-suited to implement the embodiments of the present disclosure, non-aircraft vehicles and devices can also implement the embodiments.

Figure 2C:
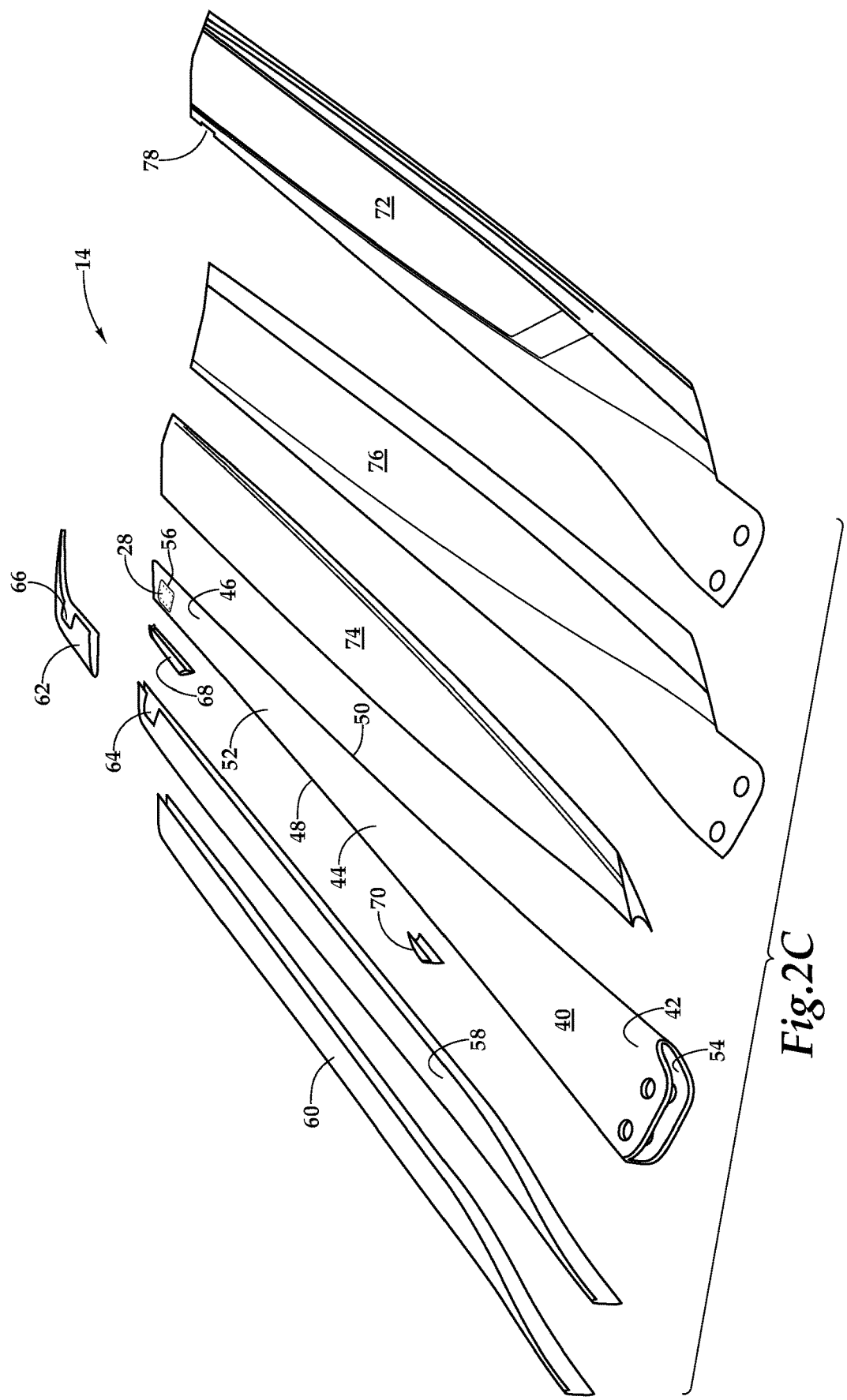

Referring to FIGS. 2A-2C in the drawings, a rotor blade 14 is illustrated in greater detail. Rotor blade 14 includes a blade spar 40 that is the main structural member of rotor blade 14 designed to carry the primary centrifugal and bending loads of rotor blade 14. Blade spar 40 has a root end 42, a main section 44, a tip region 46, a leading side 48, a trailing side 50, an upper wall 52 and a lower wall 54. In the illustrated embodiment, blade spar 40 has a generally oval cross section along at least main section 44 and tip region 46 with smooth transitions between leading side 48, upper wall 52, trailing side 50 and lower wall 54. Blade spar 40 is preferably a monolithic structure that may be formed from composite materials that may include numerous material plies composed of continuous filaments or fibers including one or more of glass, carbon, graphite, basalt, aromatic polyamide materials or the like and any combination thereof. The material plies may be in the form of fabrics such as woven fabrics, tape such as unidirectional tape and the like. The material plies may be joined together with a resin such as a polymeric matrix including thermoplastic or thermosetting resin or any suitable resin system. After curing, the material layers form a high strength and lightweight solid composite member. Blade spar 40 has an opening 56 through upper wall 52 in tip region 46 that may be machined or otherwise cut in upper wall 52 after curing. A balance weight assembly 28 is disposed within opening 56 and is coupled to blade spar 40 with a clamping relationship as discussed herein.

A composite sheath 58, an abrasion resistant strip 60 and a tip cap 62 form the leading edge of rotor blade 14. As illustrated, sheath 58 has a generally C-shaped cross section and is securably attached spanwise to blade spar 40 using adhesive, curing or other suitable coupling technique. Sheath 58 is preferably formed from one or more of glass, carbon, graphite, basalt, aromatic polyamide materials or the like and any combination thereof. Sheath 58 may serve as a structural member of rotor blade 14 including providing shear stiffness to rotor blade 14. In the illustrated embodiment, sheath 58 has a notch 64 to provide access to balance weight assembly 28. Abrasion resistant strip 60 is disposed spanwise on the leading edge of sheath 58 and is securably attached thereto using adhesive or other suitable coupling technique. Abrasion resistant strip 60 may be formed from a metal such as stainless steel and is designed to protect the other components of rotor blade 14 from erosion and impacts. Likewise, tip cap 62 is disposed at least partially on the leading edge of sheath 58 and is securably attached thereto using adhesive or other suitable coupling technique. Tip cap 62 may be formed from a metal such as stainless steel and is designed to protect the other components of rotor blade 14 from erosion and impacts. In the illustrated embodiment, tip cap 62 has a notch 66 to provide access to balance weight assembly 28. Rotor blade 14 includes one or more tuning or inertia weights, such as tip weight 68 and mid span weight 70.

An upper skin 72, a core 74 and a lower skin 76 form the afterbody of rotor blade 14. Upper skin 72 and lower skin 76 are preferably formed from one or more of glass, carbon, graphite, basalt, aromatic polyamide materials or the like and any combination thereof. Upper skin 72 and lower skin 76 serve as structural members of rotor blade 14 and are securably attached spanwise to blade spar 40 using adhesive, curing or other suitable coupling technique. In the illustrated embodiment, upper skin 72 has a notch 78 to provide access to balance weight assembly 28. Core 74 may be a Nomex honeycomb structure disposed spanwise along trailing side 50 of blade spar 40. Core 74 provides stability, compression resistance and shear transfer between upper skin 72 and lower skin 76. Even though a particular rotor blade has been depicted and described, it should be understood by those having ordinary skill in the art that the balance weight assemblies of the present disclosure could be utilized in rotor blades having other designs or rotor blades made from other materials. For example, the balance weight assemblies of the present disclosure could be utilized in rotor blades formed from fiberglass, carbon, composite, thermoplastic, metallic materials, such as aluminum, wood or any other material. Alternatively or additionally, the balance weight assemblies of the present disclosure could be utilized in rotor blades including any types of components, such as heat shields, heater blankets, foam fillers, erosion shields or other components.

Figure 3A:
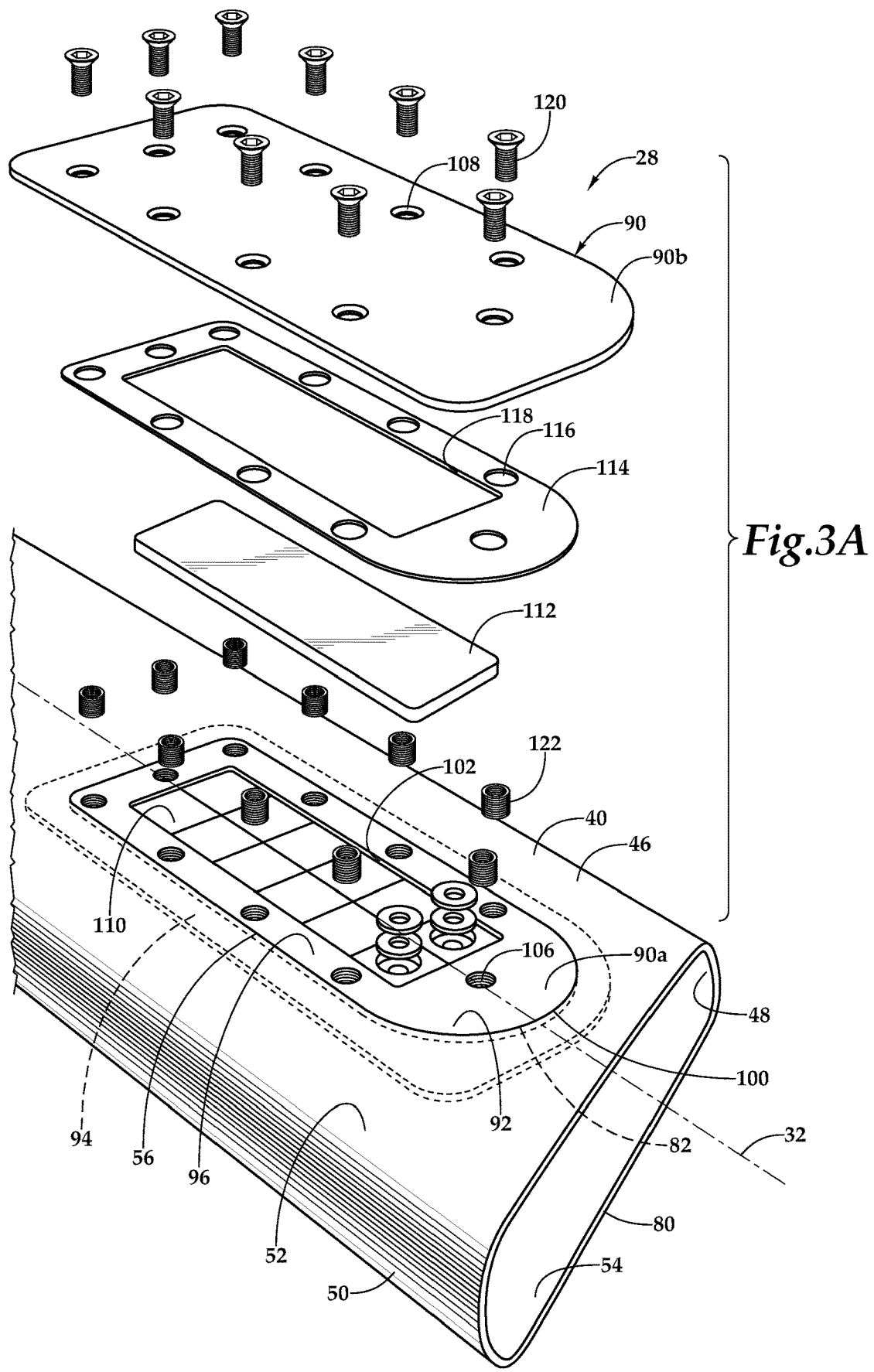
FIGS. 3A-3B are exploded views of a balance weight assembly positionable in an opening of a hollow blade spar in accordance with embodiments of the present disclosure.
Figure 4:
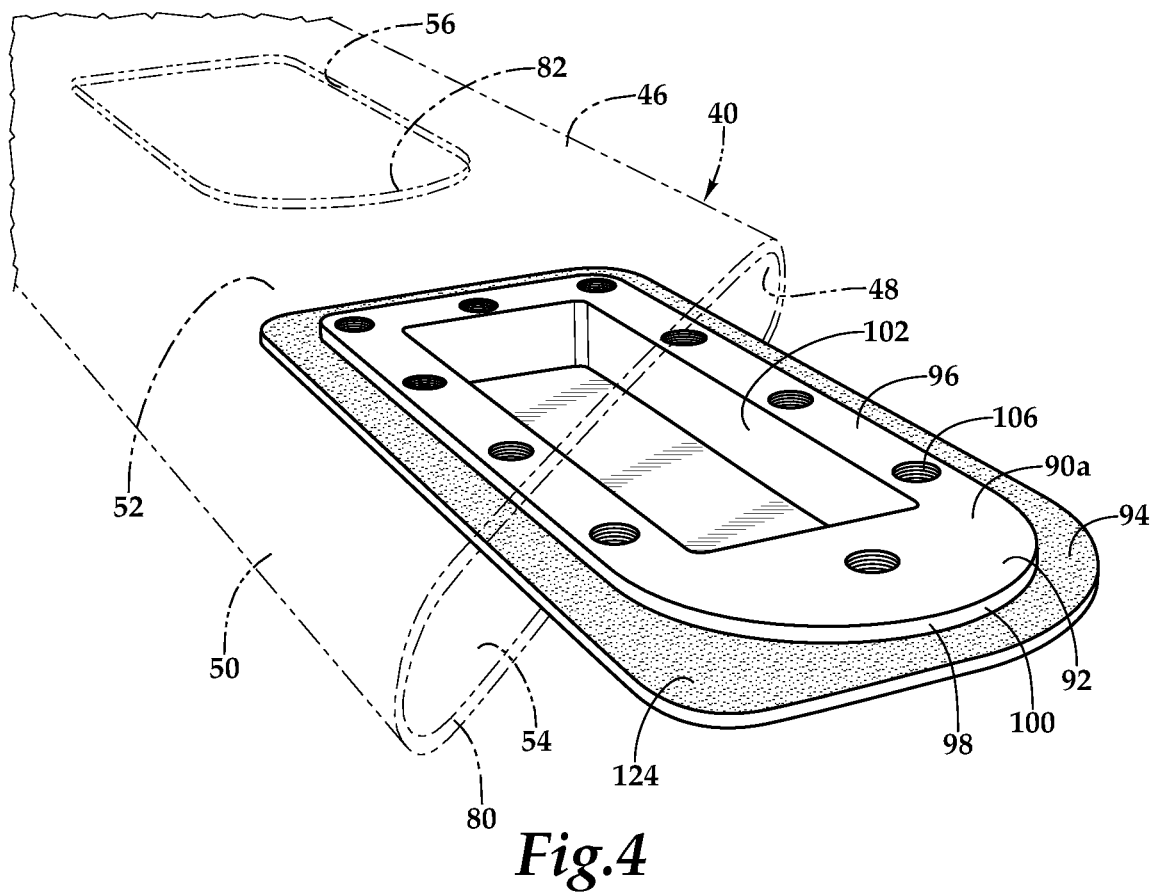
FIG. 4 is a perspective view of a balance weight tray being inserted into an open end of a hollow blade spar in accordance with embodiments of the present disclosure.

Referring to FIG. 3A in the drawings, a tip region 46 of a blade spar 40 and an exploded balance weight assembly 28 are depicted. Tip region 46 of blade spar 40 has a generally oval cross section with smooth transitions between leading side 48, upper wall 52, trailing side 50 and lower wall 54. Blade spar 40 has an open outboard end 80 and an opening 56 through upper wall 52, as best seen in FIG. 4. Opening 56 has an outboard centrifugal force reaction surface 82 that is depicted as an arcuate surface such as a semicircular surface. In other embodiments, outboard centrifugal force reaction surface 82 could have other contours to match specific requirements or constraints.

Figure 5:
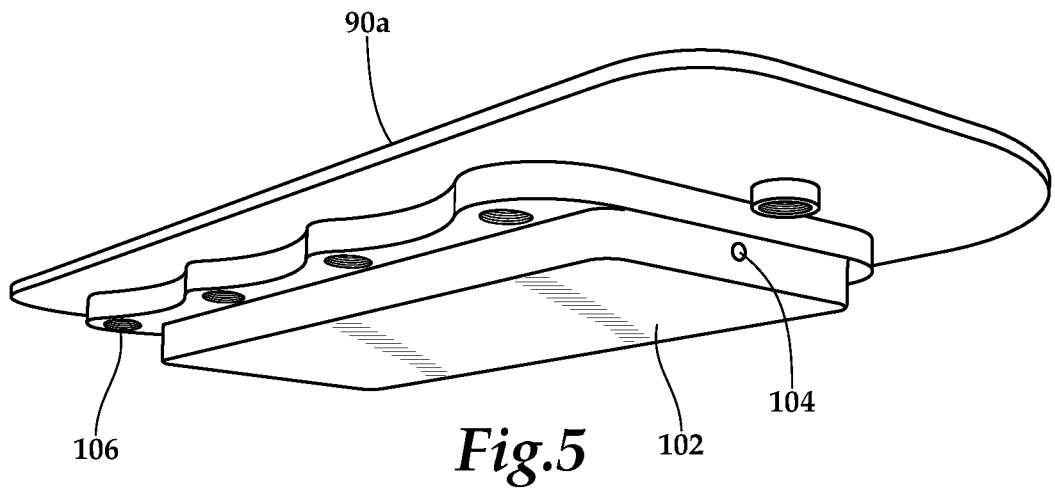
FIG. 5 is a perspective view of a lower surface of a balance weight tray for use in a balance weight assembly in accordance with embodiments of the present disclosure.

Balance weight assembly 28 includes a balance weight pocket 90 formed by coupling a balance weight tray 90a and a cover 90b. In the illustrated embodiment, balance weight tray 90a has an upper surface 92 including a lip region 94 that extends outwardly from a projected region 96 that extends upwardly from lip region 94, as best seen in FIG. 4. Projected region 96 includes a rim 98 defining the perimeter of projected region 96. Rim 98 includes an outboard boss 100 that is depicted as an arcuate surface such as a semi-circular surface that acts as a centrifugal force reaction surface. Balance weight tray 90a defines a balance weight receiving cavity 102 recessed from upper surface 92 and more particularly from projected region 96. As best seen in FIG. 5, balance weight receiving cavity 102 has a drain path 104 in the outboard end such that any fluids entering balance weight receiving cavity 102 will be expelled through drain path 104 responsive to centrifugal force acting upon such fluids. Balance weight tray 90a has a pattern of threaded fastener openings 106 that surround balance weight receiving cavity 102 extending from upper surface 92 to a lower surface of balance weight tray 90a through projected region 96. In the illustrated embodiment, portions of the underside of balance weight tray 90a provide reinforcement for threaded fastener openings 106 by providing an extended length and lateral support for threaded fastener openings 106. Cover 90b preferably has the same perimeter shape as upper surface 92 of balance weight tray 90a and has a pattern of fastener openings 108 that matches the pattern of threaded fastener openings 106 of balance weight tray 90a. Non-limiting examples of materials from which balance weight tray 90a and cover 90b may be formed include metals such as steel, stainless steel, corrosion resistant steel, aluminum, titanium or other suitable metallic material. Balance weight tray 90a and cover 90b may be formed using additive and/or material removal processes including machining.

A weight package depicted as a plurality of balance weights 110 is disposed within balance weight receiving cavity 102. In the illustrated embodiment, each balance weight 110 has a rectangular prism or cuboid shape. In other embodiments, balance weights 110 could have alternate shapes including, for example, thin plates that are stackable within balance weight receiving cavity 102. Balance weights 110 may be formed from any suitable material depending upon the desired weight characteristic such as metals of different density including tungsten, tungsten alloys, steel, aluminum, aluminum alloys as well as nonmetals such as polymers. The weight package may be on the order of one to five pounds depending upon the balancing requirements. As it is desirable to fill the entire space within balance weight receiving cavity 102, certain of the balance weights 110 may be spacer elements, for example, balance weights 110 formed from light materials such as aluminum, aluminum alloys or polymers may act as the spacer elements. Others of the balance weights 110 are the weight elements, for example, balance weights 110 formed from tungsten or tungsten alloys may act as the weight elements. Certain of the balance weights 110 may be constant weight elements while other balance weights 110 may be variable weight elements. For example, in the illustrated embodiment, the two outboard locations of balance weight receiving cavity 102 have balance weights 110 disposed therein that include individually removable and stackable ring weights formed from tungsten or other desired material for fine tuning weight adjustments.

Figure 3B:
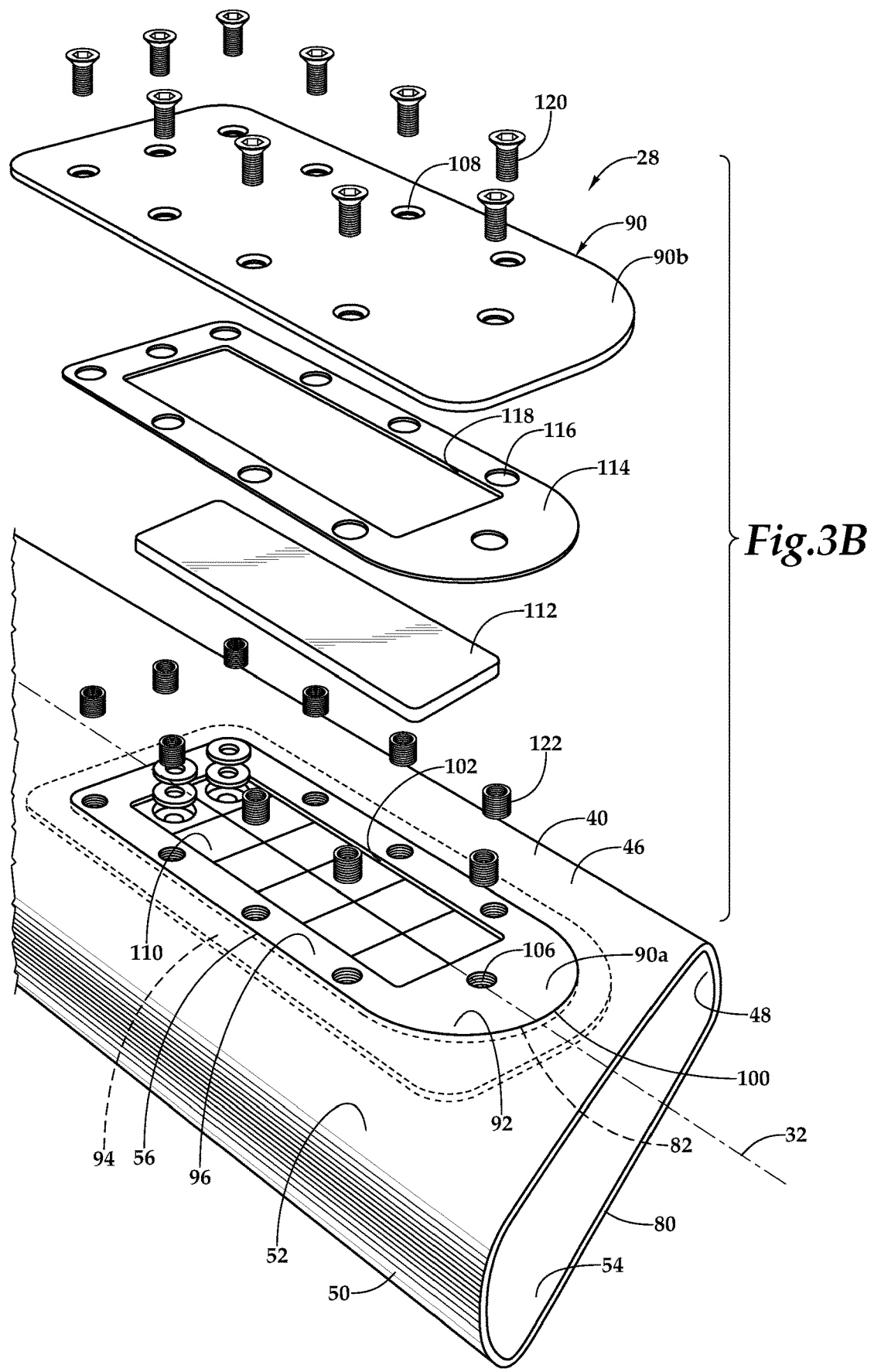

Using balance weights 110 that have various weight characteristics enables variable weight distributions for both spanwise and chordwise balancing of rotor blade 14. For example, in illustrated embodiment, the balance weight distribution could include weight elements in the eight outboard locations and spacer elements in the four inboard locations. In another example, the balance weight distribution could include weight elements in the six outboard locations and spacer elements in the six inboard locations. By varying the weight distribution inboard and outboard, spanwise balancing of rotor blade 14 is achieved. Similarly, in a balance weight distribution, the six leading balance weights 110 could include four weight elements and two spacer elements while the six trailing balance weights 110 could include three weight elements and three spacer elements. In another example, in a balance weight distribution, the six leading balance weights 110 could include three weight elements and three spacer elements while the six trailing balance weights 110 could include six weight elements. By varying the weight distribution leading and trailing, chordwise balancing of rotor blade 14 is achieved. It is noted that in the illustrated embodiment, the leading balance weights are located on the leading side of pitch change axis 32 and the trailing balance weights are located on the trailing side of the pitch change axis 32. As such, it should be understood by those having ordinary skill in the art that balance weights 110 may be positioned within balance weight receiving cavity 102 to achieve any desired balance weight distribution. For example, even though FIG. 3A depicts the use of two variable weight elements positioned in the two outboard locations of balance weight receiving cavity 102, it should be understood by those having ordinary skill in the art that any number of variable weight elements in any inboard, outboard, leading or trailing location could be desirable. Such an alternate balance weight distribution is depicted in FIG. 3B, wherein two variable weight elements are positioned in the two inboard locations of balance weight receiving cavity 102.

Balance weight assembly 28 may include a compressible member 112 that is positioned between balance weights 110 and a lower surface of cover 90b to fill any gaps therebetween when balance weight pocket 90 is fully assembled. Compressible member 112 may be formed from foam, rubber, silicone or other suitably resilient material such that pressure applied from cover 90b on compressible member 112 will create a compressive force on compressible member 112 which tends to prevent movement of balance weights 110 during flight. Balance weight assembly 28 may also include one or more gaskets 114 positioned between cover 90b and projected region 96 of balance weight tray 90a. Gaskets 114 not only prevent fluid infiltration into balance weight receiving cavity 102 and fastener openings 106 but are also used to adjust the location of the upper surface of cover 90b such that the upper surface is substantially flush with the airfoil surface of rotor blade 14. Gaskets 114 have a pattern of fastener openings 116 that matches the pattern of threaded fastener openings 106 of balance weight tray 90a. In addition, gaskets 114 have a central opening 118 sized to received compressible member 112 therethrough.

Balance weight pocket 90 is assembled using a plurality of fasteners to couple cover 90b to balance weight tray 90a. In the illustrated embodiment, ten threaded bolts 120 and ten self-locking threaded inserts 122 are used to couple cover 90b to balance weight tray 90a. More specifically, self-locking threaded inserts 122 are threadedly received and locked within threaded fastener openings 106 of balance weight tray 90a. Bolts 120 extend through fastener openings 108 of cover 90b and fastener openings 116 of gaskets 114 and are threadedly received and locked within self-locking threaded inserts 122. When cover 90b is coupled to balance weight tray 90a in this manner, lip region 94 of balance weight tray 90a and a mirror image portion of cover 90b have a clamping relationship with blade spar 40, thereby securably coupling balance weight pocket 90 to blade spar 40. This clamping relationship between balance weight pocket 90 and blade spar 40 eliminates the need for any load bearing fasteners to extend through the structure of blade spar 40.

As best seen in FIG. 4, assembly of balance weight pocket 90 in blade spar 40 includes inserting balance weight tray 90a into open end 80 of blade spar 40. Preferably, lip region 94 of balance weight tray 90a has an adhesive layer 124 disposed thereon such that a bonded relationship is formed between lip region 94 of balance weight tray 90a and an interior surface of blade spar 40 when projected region 96 is inserted into open 56 of blade spar 40. Importantly, when fully assembled, outboard boss 100 of balance weight tray 90a has a contact relationship with outboard surface 82 of opening 56 of blade spar 40. As illustrated, outboard surface 82 of blade spar 40 and outboard boss 100 of balance weight tray 90a are complementary surfaces such as complementary arcuate surfaces or complementary semicircular surfaces such that the centrifugal force of balance weight assembly 28 is reacted to outboard surface 82 and therefore to blade spar 40 by outboard boss 100. As used herein, to react the centrifugal force of a first object to a second object is to cause the load of the reactive centrifugal force on the first object to bear on the second object.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A balance weight assembly for a rotor blade of a rotorcraft, the rotor blade including a hollow blade spar having upper and lower walls, the upper wall having interior and exterior surfaces and an opening with an outboard surface, the balance weight assembly comprising:
   a balance weight pocket including a balance weight tray and a cover, the balance weight tray having an upper surface including a lip region extending outwardly from a projected region with an outboard boss, the balance weight tray defining a balance weight receiving cavity recessed from the upper surface, the cover having a lower surface; and
   a plurality of balance weights disposed within the balance weight receiving cavity;
   wherein, the projected region of the balance weight tray is disposed within the opening of the blade spar such that the outboard boss of the balance weight tray has a contact relationship with the outboard surface of the opening of the blade spar; and
   wherein, the lip region of the balance weight tray has a contact relationship with the interior surface of the upper wall of the blade spar and a portion of the lower surface of the cover has a contact relationship with the exterior surface of the upper wall of the blade spar such that when the cover is coupled to the balance weight tray, the lip region of the balance weight tray and the portion of the lower surface of the cover have a clamping relationship with the upper wall of the blade spar, thereby coupling the balance weight pocket to the blade spar.

2. The balance weight assembly as recited in claim 1 wherein the outboard surface of the opening in the blade spar and the outboard boss of the balance weight tray have complementary surfaces.

3. The balance weight assembly as recited in claim 1 wherein the outboard surface of the opening in the blade spar and the outboard boss of the balance weight tray have complementary arcuate surfaces.

4. The balance weight assembly as recited in claim 1 wherein the outboard surface of the opening in the blade spar and the outboard boss of the balance weight tray have complementary semicircular surfaces.

5. The balance weight assembly as recited in claim 1 wherein the outboard surface of the opening in the blade spar is a centrifugal force reaction surface for the outboard boss.

6. The balance weight assembly as recited in claim 1 further comprising an adhesive layer disposed between the lip region of the balance weight tray and the interior surface of the upper wall of the blade spar forming a bonded relationship therebetween.

7. The balance weight assembly as recited in claim 1 further comprising a plurality of fasteners coupling the cover to the balance weight tray through fastener openings in the projected region of the balance tray, thereby not requiring fastener openings in the blade spar.

8. The balance weight assembly as recited in claim 7 wherein the plurality of fasteners further comprises a plurality of bolts.

9. The balance weight assembly as recited in claim 7 wherein the plurality of fasteners further comprises a plurality of bolts and a plurality of self-locking threaded inserts positioned within the fastener openings in the projected region of the balance tray.

10. The balance weight assembly as recited in claim 1 wherein the plurality of balance weights further comprises a plurality of constant weight elements.

11. The balance weight assembly as recited in claim 1 wherein the plurality of balance weights further comprises a plurality of constant weight elements and a plurality of variable weight elements configured for fine tuning weight adjustments.

12. The balance weight assembly as recited in claim 1 wherein the plurality of balance weights further comprises a plurality of weight elements and a plurality of spacer elements.

13. The balance weight assembly as recited in claim 1 wherein the plurality of balance weights further comprises a plurality of leading weight elements and a plurality of trailing weight elements.

14. The balance weight assembly as recited in claim 1 wherein the plurality of balance weights further comprises a plurality of outboard weight elements and a plurality of inboard weight elements.

15. The balance weight assembly as recited in claim 1 wherein the plurality of balance weights are configured for variable weight distributions enabling spanwise and chordwise balancing of the rotor blade.

16. The balance weight assembly as recited in claim 1 further comprising:
   at least one gasket positioned between the cover and the projected region of the balance weight tray; and
   at least one compressible member disposed between the cover and the balance weights to prevent movement of the balance weights during flight.

17. A rotor system for a rotorcraft, the rotor system comprising:
   a first rotor blade having an outer airfoil surface with a hollow blade spar disposed therein, the blade spar having upper and lower walls, the upper wall having interior and exterior surfaces and an opening with an outboard surface;
   a balance weight pocket including a balance weight tray and a cover, the balance weight tray having an upper surface including a lip region extending outwardly from a projected region with an outboard boss, the balance weight tray defining a balance weight receiving cavity recessed from the upper surface, the cover having a lower surface; and
   a plurality of balance weights disposed within the balance weight receiving cavity;
   wherein, the projected region of the balance weight tray is disposed within the opening of the blade spar such that the outboard boss of the balance weight tray has a contact relationship with the outboard surface of the opening of the blade spar; and
   wherein, the lip region of the balance weight tray has a contact relationship with the interior surface of the upper wall of the blade spar and a portion of the lower surface of the cover has a contact relationship with the exterior surface of the upper wall of the blade spar such that when the cover is coupled to the balance weight tray, the lip region of the balance weight tray and the portion of the lower surface of the cover have a clamping relationship with the upper wall of the blade spar, thereby coupling the balance weight pocket to the blade spar.

18. The rotor system as recited in claim 17 wherein the first rotor blade has a tip region and a pitch change axis;
   wherein, the balance weight pocket is disposed within the tip region of the first rotor blade; and
   wherein, the balance weight pocket is aligned with the pitch change axis.

19. A rotorcraft comprising:
   a fuselage;
   a rotor system rotatable relative to the fuselage, the rotor system including a rotor hub and a plurality of rotor blades including a first rotor blade, the first rotor blade having an outer airfoil surface with a hollow blade spar disposed therein, the blade spar having upper and lower walls, the upper wall having interior and exterior surfaces and an opening with an outboard surface;
   a balance weight pocket including a balance weight tray and a cover, the balance weight tray having an upper surface including a lip region extending outwardly from a projected region with an outboard boss, the balance weight tray defining a balance weight receiving cavity recessed from the upper surface, the cover having a lower surface; and
   a plurality of balance weights disposed within the balance weight receiving cavity;
   wherein, the projected region of the balance weight tray is disposed within the opening of the blade spar such that the outboard boss of the balance weight tray has a contact relationship with the outboard surface of the opening of the blade spar; and
   wherein, the lip region of the balance weight tray has a contact relationship with the interior surface of the upper wall of the blade spar and a portion of the lower surface of the cover has a contact relationship with the exterior surface of the upper wall of the blade spar such that when the cover is coupled to the balance weight tray, the lip region of the balance weight tray and the portion of the lower surface of the cover have a clamping relationship with the upper wall of the blade spar, thereby coupling the balance weight pocket to the blade spar.

20. The rotorcraft as recited in claim 19 wherein the rotorcraft is a helicopter.

* * * * *